(12) United States Patent
Maskaliunas

(10) Patent No.: US 7,594,664 B2
(45) Date of Patent: Sep. 29, 2009

(54) SEAL WITH PYRAMID SHAPED FORMATION

(75) Inventor: Linas L. Maskaliunas, Geneva, IL (US)

(73) Assignee: SKF USA Inc., Elgin, IL (US)

( * ) Notice: Subject to any disclaimer, the term of this patent is extended or adjusted under 35 U.S.C. 154(b) by 113 days.

(21) Appl. No.: 11/467,959

(22) Filed: Aug. 29, 2006

(65) Prior Publication Data

US 2008/0054572 A1 Mar. 6, 2008

(51) Int. Cl.
*F16J 15/32* (2006.01)
(52) U.S. Cl. .................. 277/551; 277/571; 277/572
(58) Field of Classification Search .......... 277/551, 277/571, 572
See application file for complete search history.

(56) References Cited

U.S. PATENT DOCUMENTS

| | | | | |
|---|---|---|---|---|
| 3,658,841 A | * | 4/1972 | Fried | 548/575 |
| 4,906,009 A | * | 3/1990 | Saitoh | 277/349 |
| 4,936,591 A | * | 6/1990 | Romero | 277/551 |
| 5,201,528 A | * | 4/1993 | Upper | 277/394 |
| 5,997,005 A | * | 12/1999 | Gold et al. | 277/402 |
| 6,733,917 B1 | * | 5/2004 | Janmey | 429/56 |
| 7,396,016 B2 | * | 7/2008 | Liao et al. | 277/353 |

* cited by examiner

*Primary Examiner*—Vishal Patel
(74) *Attorney, Agent, or Firm*—Vedder Price P.C.

(57) ABSTRACT

A seal assembly having a seal bumper wall with a series of pyramid shaped formations lying on the bumper wall. The formations cause their apex portion to wear down rapidly in use, while the remainder of the pyramids remain and act as slingers and/or produce a convection effect to reduce temperature along the sealed area. In another embodiment, there are two each pyramid shaped formations located on each of several thrust bumpers, which are held in position by a retainer.

8 Claims, 5 Drawing Sheets

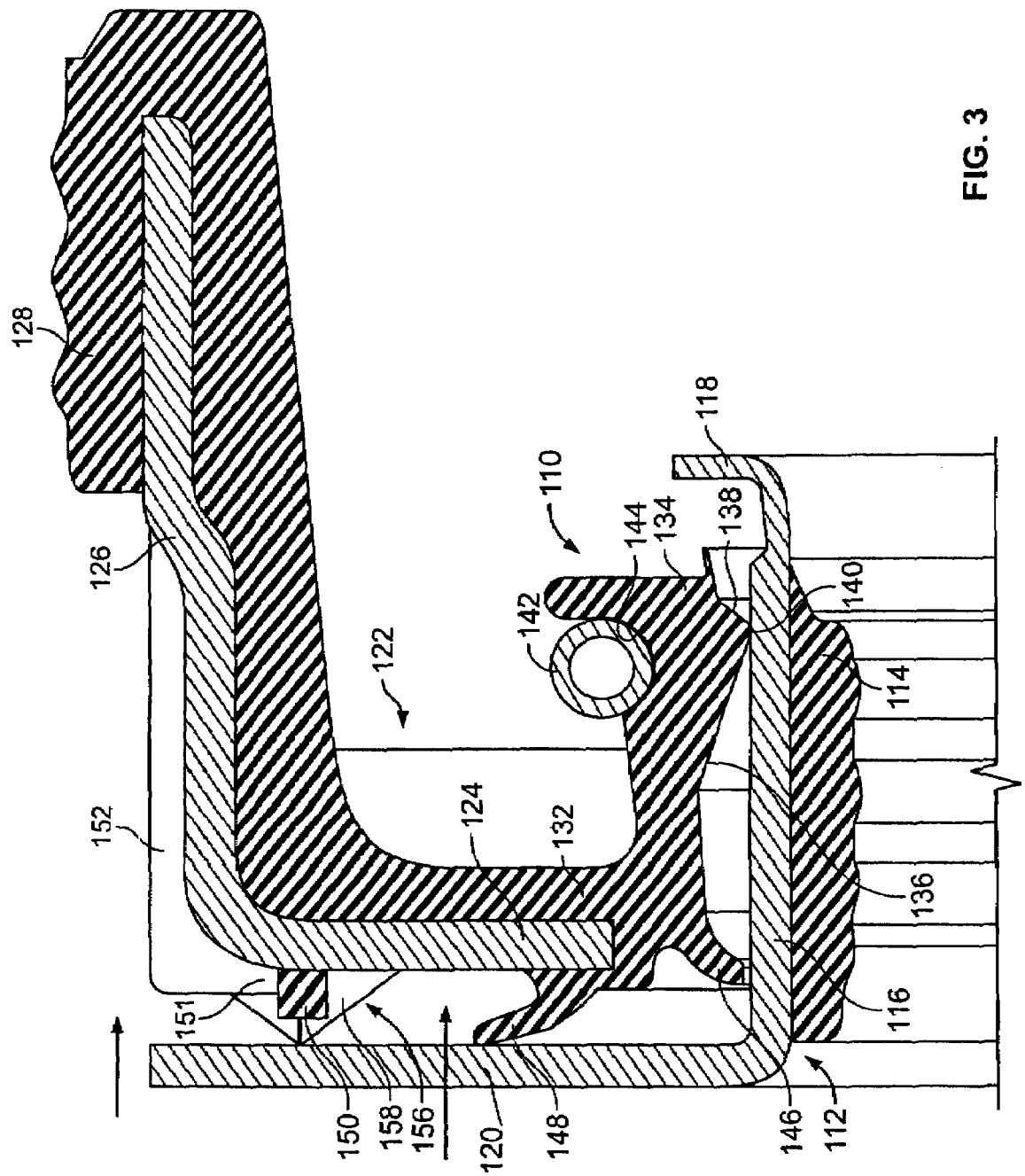

SEAL WITH PYRAMID SHAPED FORMATION

BACKGROUND OF THE INVENTION

The present invention relates generally to unitized seals, and more particularly, to a seal having plural pyramid shaped formations designed to reduce the temperature at the bumper wall-sleeve interface and also to provide additional beneficial effects. The seal design provides a slinging effect to grease on the inner side of the seal and provides a slinging effect on the external contaminants on the outer side. Moreover, the seal design provides a cooling effect to the interface between the bumper wall and the radial flange of the wear sleeve by utilizing the remains of the pyramid wall to create additional air convection.

The present invention provides a sacrificial member in the bumper wall that will abrade quickly under dynamic conditions, and thus relieve the compressive forces acting on the bumper wall. The net effect after a short break-in period is a line-to-line condition, between the sleeve and the remaining bumper wall, creating a barrier to environmental contacts. The present invention provides a tiny area, which gradually becomes bigger, and eventually is abraded into a parallel condition with the bumper wall on the radial flange of a unitized seal. This allows the pyramid shaped formation to wear away with a different degree of abrasion until, when it is completely or almost completely worn away, there is substantially line-to-line contact, or an area of minimal contact, between the bumper wall which was formed on the radial flange of the seal member and the wear sleeve. Accordingly, the seal can be assembled and placed in use with a maximum of confidence that the pyramid formations will wear away with a small amount of scrap rubber being thus generated.

The present invention relates mostly to large, heavy duty unitized seals wherein the wear sleeve is normally held against rotation and fixed over an axle stub or the like by means of a rubber inside diameter (I.D.) creating an interference fit. Of course, it could have other applications. In one embodiment, the seal is unitized by turning up an end portion of its axial flange, and the other or radial flange is acted upon by the pyramid shaped formation. The radial flange of the wear sleeve may also engage one or more dirt or dust lips or the like to prevent undue contamination of the seal area.

The seal itself, wherein the seal is bonded to a radial flange, includes the customary air side and oil side surfaces which meet along a seal band or line of intended contact with the wear sleeve. The seal body conventionally includes a groove for a garter spring and an accompanying garter spring to maintain the radial load on the seal. The axial end portion of the seal casing is also fitted with a rubber sleeve to allow for the seal to be installed with a rubber O.D. (outside diameter). The place where the seal casing axial flange turns into the radial flange contains a plurality of spaced apart chaplets, which are circumferentially discontinuous, and which present a radial face which is spaced just apart from the radial flange of the seal casing. These are termed "chaplets" or the like, and they terminate at a bumper wall which extends circumferentially around the seal casing. There are a plurality of small, spaced apart pyramid shaped formations which present four sidewalls, two of which have an identical shape and terminate on the casing, and the other two of which terminate on the end faces of the chaplets.

Accordingly, it is an object of the present invention to provide an oil seal of the unitized type or other seal having a bumper wall extending circumferentially around its radial flange with a plurality of pyramid shaped formations spaced circumferentially apart on the bumper wall.

Another object of the invention is to provide a unitized or other style of seal having a casing with a plurality of chaplets on its outside diameter, with the plural pyramid shaped formations intersecting the chaplets.

Another object is to provide a plurality of pyramid shaped formations which are circumferentially spaced apart and in which the pyramid forms an initial contact with the sleeve, and wear an ultimately near zero clearance with a radial flange of the wear sleeve.

Another object of the invention is to provide a pyramid shaped formation riding on a bumper wall, with an excluder or secondary seal being provided to increase the security of the slidable connection between the flange of the wear sleeve and the casing of the seal unit.

SUMMARY OF THE INVENTION

These and other objects and advantages of the invention are achieved in practice by providing a seal bumper wall for a unitized seal assembly wherein the seal assembly includes a seal casing and preferably a wear sleeve, and wherein the seal casing includes a plurality of circumferentially spaced apart pyramid shaped formations extending toward and joining the wear sleeve flange, with such sacrificial pyramid shaped formations lying atop a bumper wall, and being designed with angularly related planar surfaces to wear rapidly and thereafter establish and maintain contact with a wear sleeve, or the like, and gradually wearing down to become substantially co-planar with the bumper wall.

The manner in which these and other objects and advantages of the invention are carried into practice will become more apparent when consideration is given to the following detailed description of the preferred embodiment of the invention in which like reference numerals indicate corresponding parts throughout.

BRIEF DESCRIPTION OF THE DRAWINGS

FIG. 3 is an enlarged vertical sectional view of the seal assembly of the invention;

DESCRIPTION OF THE PREFERRED EMBODIMENTS OF THE INVENTION

Figure 1:
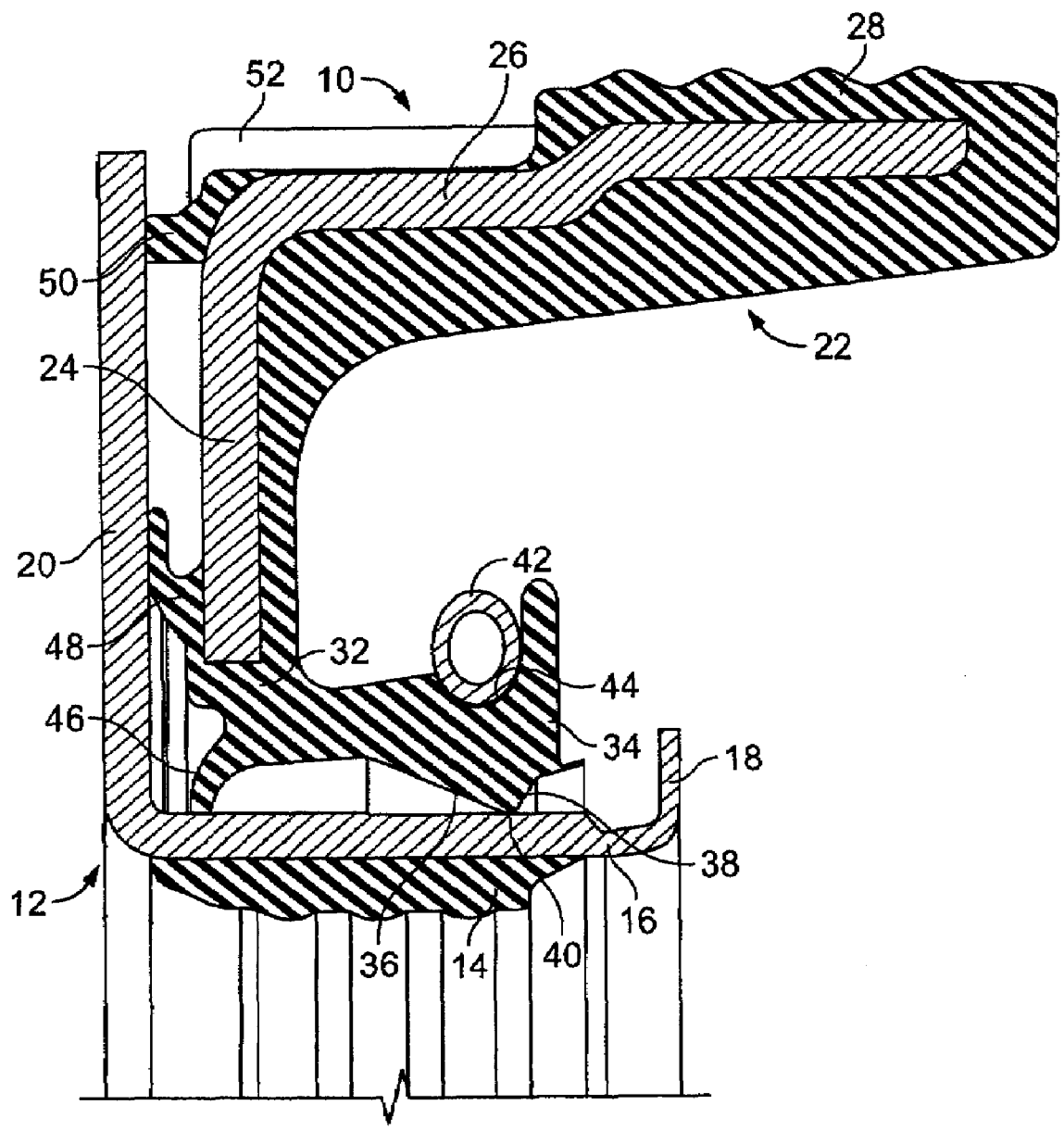
FIG. 1 is a vertical sectional view of a prior art type seal, showing the seal component and the wear sleeve.

The present invention is capable of use with large, heavy duty seals. It is useful with seals that are not large nor heavy duty. Although used primarily with unitized seals, the use is not so limited. Where an additional component, such as a plastic spacer is used between the seal and the sleeve, this concept could be applied.

Referring now to the drawings in greater detail, there is shown a prior art unitized seal generally designated 10, including a stationary wear sleeve generally designated 12 with a rubber I.D. 14 and a major axial flange 16 with a curled inward tip 18 which serves to unitize the seal 10. This wear sleeve 12 includes a radially extending flange 20.

The other component of the unitized seal 10 is a rotary portion generally designated 22 and shown to include a radial flange 24, a stepped axial flange 26, with a rubber O.D. (outside diameter) 28. This known type of seal generally designated 10 includes a portion 32 for attachment to the seal body 34.

The seal body 34 conventionally includes an air and oil side surfaces 36, 38 meeting along a seal band 40 which engages the axial flange 16 of the wear sleeve to create the primary seal.

The seal body 34 also conventionally includes a garter spring 42 contained within a spring groove 44. The seal may have an auxiliary dirt lip 46 or an excluder lip 48, or have neither or have both. The radially outer portion of the radial flange 24 contains a circumferentially extending rib 50 which is attached in part to one of a plurality of chaplets 52. The foregoing is merely typical of a prior art construction.

Referring now to the present invention, and particularly to FIG. 3, there is shown a unitized seal generally designated 110, a stationary wear sleeve 112 with a rubber inside diameter 114. This seal has a conventionally existing major axial flange 116, with a curled tip 118 creating a unitized seal. A radially extending wear sleeve flange 120, about which more will be said later, finishes this component 112.

The other major component of the unitized seal 110 is a rotary portion generally designated 122, and this includes a radially extending flange 124, a stepped axial flange 126, and a rubber outside diameter (O.D.) 128. This seal generally designated 110 also includes a portion 132 that is attached to a seal body 134. The seal body 134 conventionally includes air and oil side surfaces 136, 138, meeting along a seal band 140.

The seal body 134 may include a garter spring 142 disposed in a spring groove 144. The seal may have an auxiliary or dirt lip 146, or an excluded lip 148, and may include one or both of these lips 146, 148, neither being essential to the practice of the invention. Toward the radially outer portion of the radial flange 124 is a circumferentially extending bumper wall 150 which is attached to the inner portion 151 of one of the chaplets 152.

Figure 2:
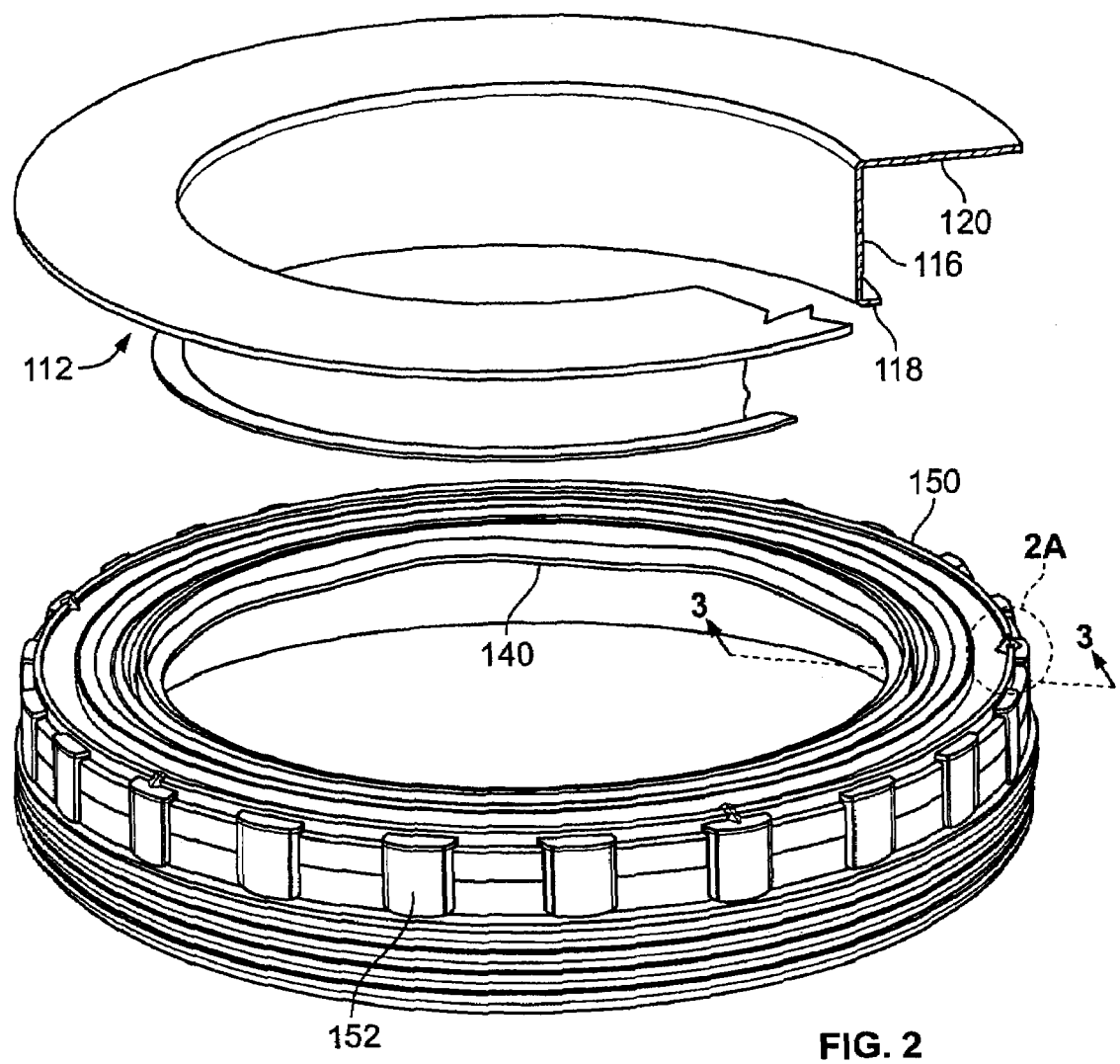
FIG. 2 is an exploded perspective view of the seal of the invention, showing the wear sleeve separated from the seal and showing the pyramid shaped formations on the bumper wall.
Figure 2A:
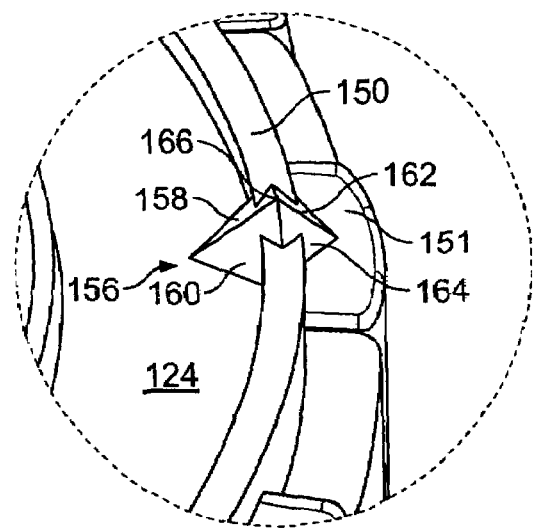
FIG. 2A is a greatly enlarged view showing the bumper wall, the chaplets and the pyramid shaped formation of the invention.

In addition, a feature which is novel is the pyramid shaped formation (FIG. 2A) generally designated 156, and this includes a large angled face 158 which extends down and joins the flange 124, it also includes an oppositely directed angled face 160 which Fig. also extends downwardly toward the flange 124. There is an included angle of about 90° between the two faces 158, 160. The pyramid also has two smaller faces 162, 164 with an included angle between them of about 90° and which terminate on the face 153 of a chaplet 152. The pyramid shaped formation includes a sharp point 166 at its apex.

The seal is installed as an ordinary seal, except that the apex 166 is pressed into contact with the radial flange 120. Upon initial rotation of the parts 110, 112, with respect to each other, the pyramid immediately begins to wear away. This abrasion relatively rapidly wears away the apex portion 166 of the pyramid 156, which relieves the compressive force acting on the bumper wall 150. As a result, there is a more or less line-to-line condition between the remaining wall 150 and the wear sleeve radial flange 120. The excluder lip 148 can readily accommodate this movement since it flexes relatively freely with the onset of an axial force. As soon as the apex and the top of the pyramid is worn away, there is an immediate reduction of temperature at the bumper wall/wear sleeve interface.

The pyramid provides a slinging effect to grease which is on either side, and the slinging effect extends to external contaminants on its outer side.

In addition to the foregoing, there is also a cooling effect between pyramid and the wear sleeve which utilizes the walls of the pyramid to create additional air convection. As a result of the foregoing, there is a reduction in possible false claims of leakage which arise due to grease purging during installation. The slinging effect of the outer pyramid walls on the environment aid in excluding the contaminants.

In contrast to current bumper geometry, there is a large surface area which allows for a generation of an excessive frictional heat under dynamic conditions. The flat surface of the bumper wall and the straight wall of the radial flange do not allow for effective disposition of the axial installation load in the prior art. Thus, there is an entire top surface of the wall that is subject to being abraided. This can also produce small particles that may act as contaminants in the operation of the seal. However, the new bumper geometry minimizes the surface area of contact and allows for improved distribution of the installation load, thereby reducing frictional heat. The geometry also allows for air convection to take place since there are now convection currents in effect to help cool and reduce the temperature at the wear sleeve/bumper wall interface.

Figure 7:
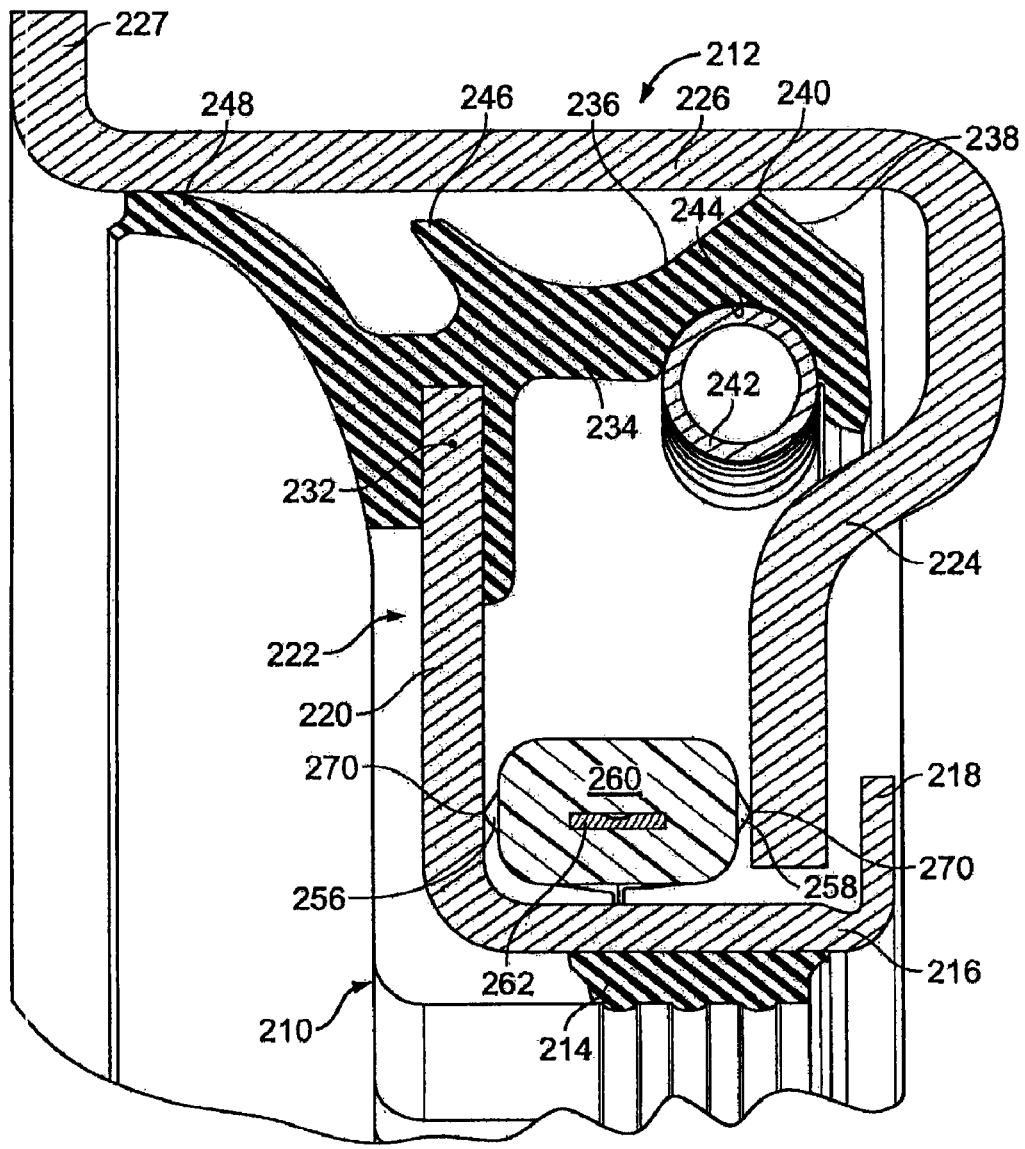
FIG. 7 shows an alternate embodiment of the invention, with the bumpers each having two pyramids.

Referring now to another embodiment of the invention, and particularly to FIG. 7, there is shown a unitized seal assembly generally designated 210, including a rotary wear sleeve generally designated 212. The seal 210 has a conventionally existing major axial flange 216, with a curled tip 218 creating a unitized seal, and a rubber inside diameter 214. A radially extending flange 220, mounts a seal body 234.

The other major components include is a fixed portion or wear sleeve generally designated 222, and this includes a radially extending flange 224, a pressed-in axial flange 226, and a stop flange 227. This seal generally designated 210 also includes a radially outermost portion 232 that is bonded to the seal body 234. The seal body 234 conventionally includes air and oil side surfaces 236, 238, meeting along a seal band 240.

The seal body 234 includes an outwardly acting garter spring 242 disposed in a spring groove 244. The seal has an auxiliary or dirt lip 246, or an excluder lip 248, and may include one or both of these lips 246, 248; however, neither is essential to the practice of the invention.

In addition, a novel feature which is embodied in a somewhat different form than in the earlier embodiments is the plural pyramid shaped formations (FIG. 7) generally designated 256 and 258 which extend from the bumper 260. The bumper 260 is one of six in this embodiment. The bumpers 260 each are secured by a retainer or belt 262 which allows the bumpers 260 to be spaced apart, but keep the same orientation. The pyramids are the same shape as their counterparts in FIG. 2A.

The seal is installed as an ordinary seal, except that there are two apexes, one on each formation. Upon initial rotation of the parts 210, 212, with respect to each other, the two pyramids immediately begin to wear away. This abrasion relatively rapidly wears away the apex portions 270 of the pyramids 256, 258, which relieves the compressive force acting on the seal flanges. As a result, there is a more or less line-to-line condition between the radial flanges and the spacer 260. The excluder lip 248 can readily accommodate this movement since it flexes relatively freely with the onset of an axial or radial force. As soon as the apex 270 and the top of the pyramid are worn away, there is an immediate reduction of temperature at interface.

Figure 4:
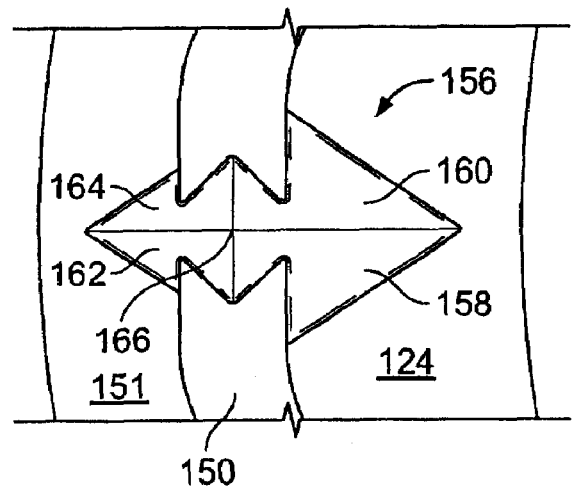
FIGS. 4-6 show portions of the pyramid shaped formation and the bumper wall, showing the formation when new (FIG. 4); when partially worn (FIG. 5); and when fully worn, and flush with the bumper wall (FIG. 6)
Figure 5:
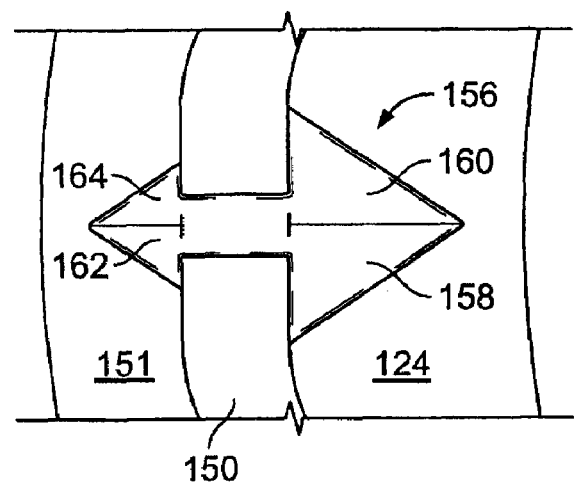
Figure 6:
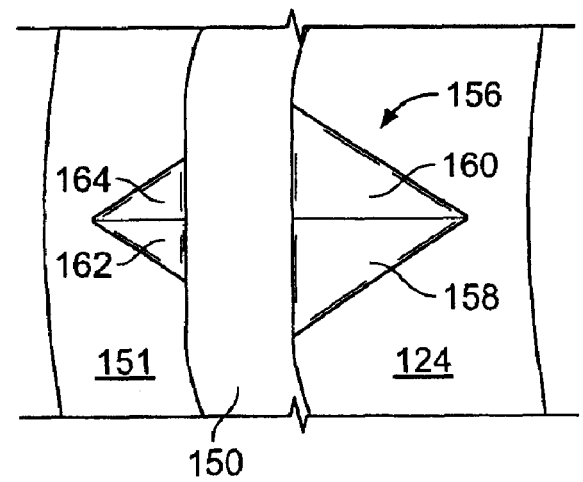

The wear patterns are very similar to those shown in FIGS. 4-6, except that the pyramids are entirely worn away.

The present invention anticipates that the components would be made from rubber or plastic; however, it is conceivable that certain types of other materials may also be used.

It will thus be seen that the present invention provides a new and effective combination of pyramid shaped formation and a bumper wall as well as a planar wear sleeve wall having a number of advantages and characteristics including those pointed out and others which are inherent in the invention.

What is claimed is:

1. A seal assembly including a seal casing and a wear sleeve, wherein said seal casing comprises:
   a first axial flange;
   a first radial flange;
   plural chaplets bonded to said seal casing, lying on a portion of said casing first axial flange, each of said chaplets having a body including portions positioned with a sidewall lying parallel to said casing first axial flange and presenting a flat end face;
   a seal body bonded to and supported on said first radial flange, said seal body having frusto-conical air and oil side surfaces meeting along a seal band contacting an axial flange of said wear sleeve and;
   a bumper wall encircling said first radial flange, said bumper wall having a series of pyramid shaped formations thereon extending toward a radial flange of said wear sleeve, each of said pyramid shaped formations having an apex radially aligned with said bumper wall, each pyramid-shaped formation having four angularly related triangular planar sides, two of said sides being adjacent sides tapering axially inwardly and two opposite sides of said pyramid shaped formation tapering axially outwardly and meeting said flat end face of one of said plural chaplets, whereby said apex of said pyramid shaped formations initially contact said radial flange of said wear sleeve upon installation, whereby the apex initially contacts but rapidly first wears away and then gradually widens with continued wear to become substantially co-planar with said bumper wall, and whereby said bumper wall protects said seal assembly from accumulating contaminants in the space between the air side of the seal and said bumper wall.

2. A seal assembly as defined in claim 1, wherein said seal assembly is a unitized seal assembly.

3. A seal assembly as defined in claim 1, wherein said plurality of pyramid shaped formations is at least four pyramid shaped formations.

4. A seal assembly as defined in claim 1, wherein said plurality of pyramid shaped formations is least six pyramid shaped formations.

5. A seal bumper as defined in claim 1, wherein said apices lie initially about 0.010 inches to 0.040 inches above said bumper wall.

6. A seal assembly as defined in claim 1 wherein the remnants of said pyramid-shaped formations act as radial slingers for debris appearing radially outwardly of at least one dirt lip on said first radial flange.

7. A seal assembly having a seal casing and a wear sleeve, wherein said seal casing comprises:
   a first axial flange;
   a first radial flange;
   plural chaplets bonded to said seal casing, lying on a portion of said casing first axial flange, each of said chaplets having a body including portions positioned with a sidewall lying parallel to said casing first axial flange and presenting a flat end face;
   a seal body supported on said first radial flange, and wherein said wear sleeve includes a wear sleeve radial flange and a wear sleeve axial flange, said seal body having air and oil side surfaces meeting along a seal band contacting said wear sleeve; and
   a bumper wall on said first radial flange, said bumper wall having a portion extending toward and nearly meeting said wear sleeve radial flange adjacent the outer diameter thereof and, located on said bumper wall, at least six pyramid shaped formations, spaced circumferentially apart, each of said pyramid shaped formations having an apex radially aligned with said bumper wall, and four angularly related planar sides, two adjacent sides tapering radially inwardly and each terminating on said casing radial flange, and two opposite sides of said pyramid shaped formation tapering radially outwardly and each terminating adjacent a radially extending face of a chaplet, said radially extending face being a flat end face meeting said two tapering radially outwardly sides of said pyramid shaped formation, the axial portion of said chaplet overlying said first axial flange, whereby said apex of said pyramid shaped formations initially contact said wear sleeve radial flange upon installation of said seal assembly, at first immediately wearing away and then flattening with continued wear to become substantially co-planar with said bumper wall.

8. A seal bumper as defined in claim 7, wherein said apex lies at first from about 0.010 inches to 0.040 inches above said bumper wall.

* * * * *

UNITED STATES PATENT AND TRADEMARK OFFICE
CERTIFICATE OF CORRECTION

PATENT NO. : 7,594,664 B2 Page 1 of 1
APPLICATION NO. : 11/467959
DATED : September 29, 2009
INVENTOR(S) : Linas L. Maskaliunas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 144 days.

Signed and Sealed this

Twenty-eighth Day of September, 2010

David J. Kappos
*Director of the United States Patent and Trademark Office*